United States Patent
Liao et al.

(10) Patent No.: US 8,374,074 B2
(45) Date of Patent: Feb. 12, 2013

(54) PHASE ROTATION METHOD FOR REDUCING PAPR

(75) Inventors: Yen-Chin Liao, Taipei (TW); Cheng-Hsuan Wu, Taipei (TW); Yung-Szu Tu, Taipei County (TW)

(73) Assignee: Ralink Technology Corp., Jhubei, Hsinchu County (TW)

(*) Notice: Subject to any disclaimer, the term of this patent is extended or adjusted under 35 U.S.C. 154(b) by 65 days.

(21) Appl. No.: 12/941,964

(22) Filed: Nov. 8, 2010

(65) Prior Publication Data
US 2011/0281534 A1 Nov. 17, 2011

Related U.S. Application Data

(60) Provisional application No. 61/345,088, filed on May 15, 2010.

(51) Int. Cl.
*H04J 11/00* (2006.01)

(52) U.S. Cl. .................................. 370/208; 370/480
(58) Field of Classification Search ............... 370/208, 370/343, 480
See application file for complete search history.

(56) References Cited

U.S. PATENT DOCUMENTS

2003/0133433 A1* 7/2003 Cimini et al. ................. 370/342
2007/0092017 A1* 4/2007 Abedi ........................... 375/260

* cited by examiner

*Primary Examiner* — Lee Nguyen
(74) *Attorney, Agent, or Firm* — Winston Hsu; Scott Margo

(57) ABSTRACT

A method of reducing a signal peak to average power ratio (PAPR) for a transmission channel in a wireless communication system is disclosed. The transmission channel is divided into a plurality of channel segments, and the method includes calculating PAPRs corresponding to the plurality of channel segments by a plurality of phase rotation vectors; selecting a plurality of specified phase rotation vectors from the plurality of phase rotation vectors according to the calculated PAPRs; and using one of the plurality of specified phase rotation vectors to rotate a phase of a signal to be transmitted.

11 Claims, 5 Drawing Sheets

| Frequency separation(MHz) | Rotation for lower 80MHz channel segment [row_index,constant_phase] | Rotation for higher 80MHz channel segment [row_index,constant_phase] |
|---|---|---|
| 80 | [5,0] | [5,0.5] |
| 100 | [8,0] | [2,0.25] |
| 120 | [6,0] | [8,0] |
| 140 | [3,0] | [7,0.75] |
| 160 | [7,0] | [1,0.25] |
| 180 | [8,0] | [1,0.25] |
| 200 | [6,0] | [8,0] |
| 220 | [3,0] | [7,0.75] |
| 240 | [3,0] | [1,0.75] |
| 260 | [8,0] | [2,0.25] |

FIG. 5

PHASE ROTATION METHOD FOR REDUCING PAPR

CROSS REFERENCE TO RELATED APPLICATIONS

This application claims the benefit of U.S. Provisional Application No. 61/345,088, filed on May 15, 2010 and entitled "METHOD OF PHASE ROTATION FOR REDUCING PAPR", the contents of which are incorporated herein.

BACKGROUND OF THE INVENTION

1. Field of the Invention

The present invention relates to a method of phase rotation for a wireless communication system, and more particularly, to a method of phase rotation for reducing a signal PAPR in the wireless communication system.

2. Description of the Prior Art

Wireless local area network (WLAN) technology is one of popular wireless communication technologies in the world. In the beginning, WLAN technology is developed for military use, while in recent years, WLAN technology is widely implemented in consumer electronics, e.g. desktop computers, laptop computers, personal digital assistants, etc., to facilitate convenient and high-speed wireless communication. IEEE 802.11 standard is a set of WLAN protocols established by the Institute of Electrical and Electronics Engineers (IEEE). Products complying with IEEE 802.11 standard are authenticated by the Wireless Fidelity Alliance (WFA) and then offered a trademarked brand name WiFi after passing the authenticated procedures of the WFA.

In details, IEEE 802.11 is composed of more than 20 different standards distinguished from each other by a letter appended to the end of IEEE 802.11. The familiar IEEE 802.11 series is IEEE 802.11a, 802.11b, 802.11g, 802.11n standard and so on. The most difference among each of the IEEE 802.11 series is modulation method and maximum data rate. For example, for modulating signals to be transmitted, IEEE 802.11a/g/n standard utilize orthogonal frequency division multiplexing (OFDM) method, whereas IEEE 802.11b/g utilize direct-sequence spread spectrum (DSSS) method. IEEE 802.11n standard is different from IEEE 802.11a/g standard in adding a multiple-input multiple-output (MIMO) technique and other features that greatly enhance data rate and throughput. In addition, in IEEE 802.11n standard, a channel bandwidth is doubled to 40 MHz from 20 MHz in IEEE 802.11a/g.

OFDM method has advantages of high spectrum utility efficiency and capability of resisting signal attenuation caused by a multi-path propagation. After a transmitter in WLAN systems modulates signals to be transmitted by OFDM method, a peak to average power ratio (PAPR) of modulated signals may easily be excessively high, and a distortion may occur when the modulated signals are processed in radio frequency (RF) circuits of the transmitter. Afterwards, a packet detection rate in a receiver may be decreased.

In order to reduce the PAPR of modulated signals, a method of phase rotation is introduced in IEEE 802.11n standard. First, a 40 MHz channel for transmitting modulated signals in IEEE 802.11n standard is divided into two 20 MHz subchannels, which are an upper 20 MHz subchannel and a lower 20 MHz subchannel in frequency domain. Afterwards, a phase rotation of 90 degrees is applied to the upper 20 MHz subchannel so that the PAPR of the 40 MHz channel in IEEE 802.11n standard is reduced when transmitting packets with modulated signals. Thus, the packet detection probability in a receiver is improved.

Furthermore, for achievement of a higher quality WLAN transmission, the IEEE committee establishes a new generation IEEE 802.11ac standard, which is IEEE 802.11 VHT (Very High Throughput) standard. Compared to IEEE 802.11n standard, IEEE 802.11ac also utilizes MIMO technique, but doubles a channel bandwidth to 80 MHz. Moreover, IEEE 802.11ac standard may further provide a solution of a 160 MHz transmission to greatly enhance data rate and throughput. Possibly, the 160 MHz transmission may be composed of two 80 MHz channel segments with a frequency separation from each other, which is called a non-contiguous channel configuration. Due to bandwidth increase and the non-contiguous channel configuration in IEEE 802.11ac, the method of phase rotation in IEEE 802.11n standard cannot be applied directly into 802.11ac standard. Therefore, how to reduce PAPRs in IEEE 802.11ac standard is necessary to develop.

SUMMARY OF THE INVENTION

It is therefore a primary objective of the claimed invention to provide a method of phase rotation to reduce a signal peak to average power ratio (PAPR) for a transmission channel in a wireless communication system.

The present invention discloses a method of reducing a PAPR for a transmission channel in a wireless communication system. The transmission channel is divided into a plurality of channel segments and the method comprises calculating PAPRs corresponding to the plurality of channel segments by a plurality of phase rotation vectors; selecting a plurality of specified phase rotation vectors from the plurality of phase rotation vectors according to the calculated PAPRs; and using one of the plurality of specified phase rotation vectors to rotate a phase of a signal to be transmitted.

The present invention further discloses a transmitter of a wireless communication system capable of performing the method of reducing a PAPR for a transmission channel in a wireless communication system. The transmission channel is divided into a plurality of channel segments and the method comprises calculating PAPRs corresponding to the plurality of channel segments by a plurality of phase rotation vectors; selecting a plurality of specified phase rotation vectors from the plurality of phase rotation vectors according to the calculated PAPRs; and using one of the plurality of specified phase rotation vectors to rotate a phase of a signal to be transmitted.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a table for selecting phase rotation values with a varying frequency separation according to an embodiment of the present invention.

DETAILED DESCRIPTION

Figure 1:
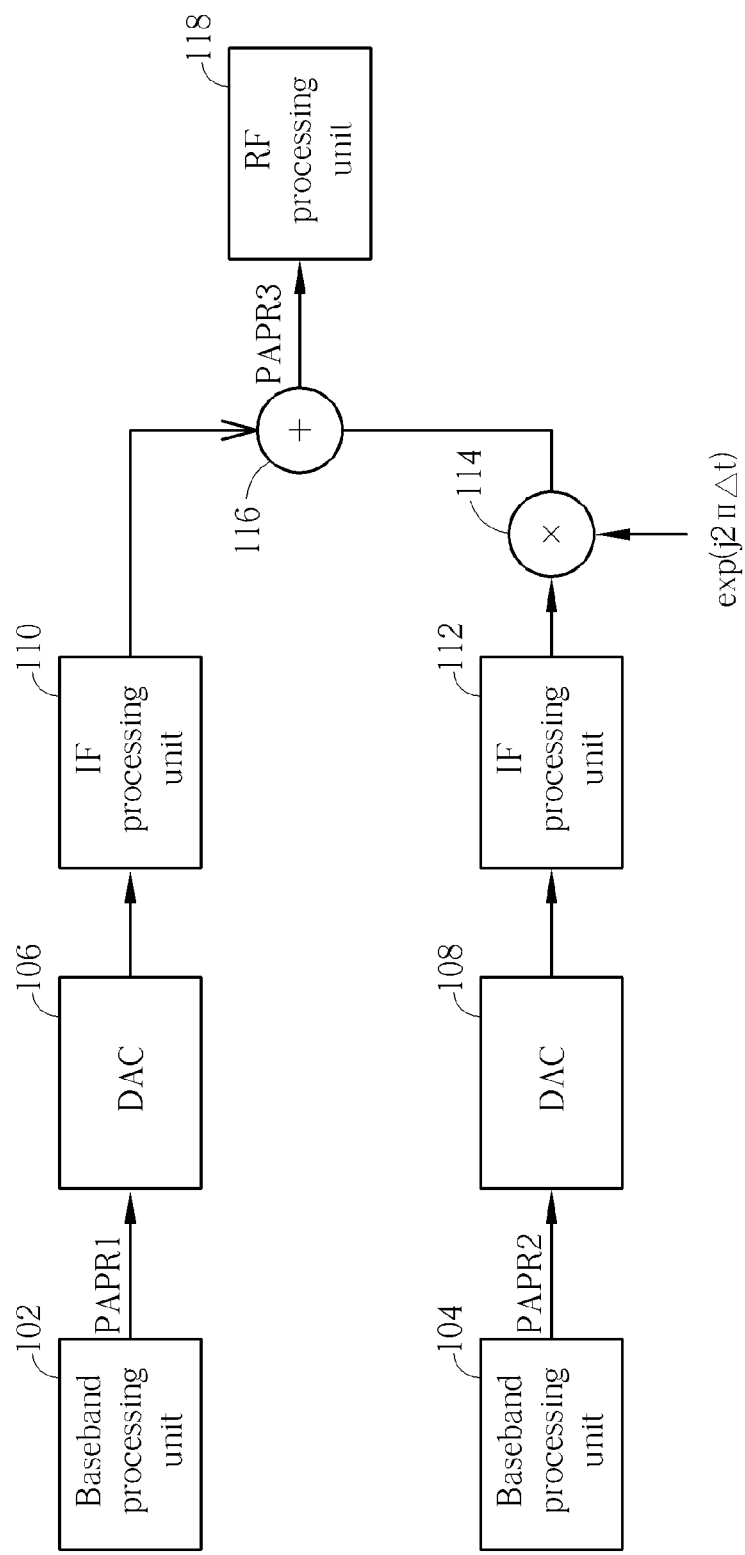
FIG. 1 is a schematic diagram of a transmitter system with a non-contiguous channel configuration according to an embodiment of the present invention.

Please refer to FIG. 1. FIG. 1 is a schematic diagram of a transmitter system 10 with a non-contiguous channel configuration according to an embodiment of the present invention. The transmitter system 10 is used for providing non-contiguous channel segments to transmit modulated signals. As can been seen from FIG. 1, the transmitter system 10 is divided into an upper part and a lower part, which represent two individual channels for transmitting modulated signals and have similar structures. The upper part comprises a baseband processing unit 102, a digital-to analog converter (DAC) 106 and an intermediate frequency (IF) processing unit 110. Similarly, the lower part 112 comprises a baseband processing unit 104, a DAC 108 and an IF processing unit 112, while the lower part further comprises an frequency shifter 114 in comparison to the upper part. The DACs 106, 108 transform analog signals to digital signals in baseband, and the IF processing units 110, 112 further convert frequencies of the digital signals from baseband to IF bands. The frequency shifter 114 multiplies the IF digital signal in the lower part by $\exp(j2\pi\Delta t)$. Then, the IF digital signals of the upper part and the lower part are summed by an adder 116, and converted into RF band by a RF processing unit 118.

As can be seen, the IF digital signal in the lower part has the frequency shift of $\exp(j2\pi\Delta t)$ in comparison to the IF digital signal in the upper part. Therefore, the RF signals are distributed in two non-contiguous channel segments with a frequency separation in the frequency domain after summing the IF digital signals of the upper part and the lower part and converting the summed IF digital signals into RF band.

Note that, the main concept of the transmitter system 10 is to be designed by a number of required non-contiguous channel segments and a required frequency separation between non-contiguous channel segments, and those skilled in the art can make alternations or modifications accordingly. In addition, the step of transforming analog signals to digital signals by DACs produces a peak to average power ratio (PAPR) in both the upper part and the lower part, i.e. a PAPR1 and a PAPR2 as shown in FIG. 1. A PAPR3 is regarded as a total PAPR of the transmitter system 10 and is related to the PAPR1, the PAPR2 and the frequency separation.

Figure 2:
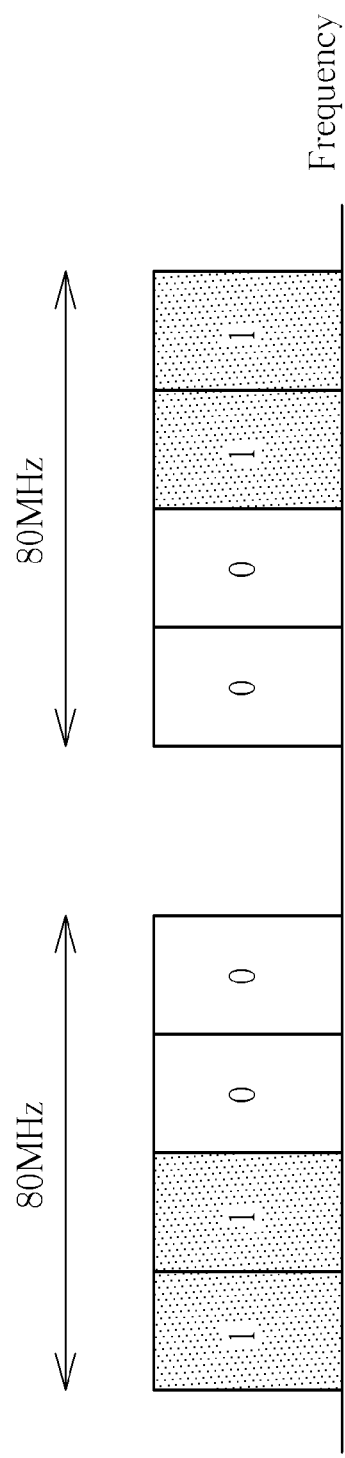
FIG. 2 is a schematic diagram of a channel mask used by a plurality of 80 MHZ channel segments in frequency domain according to an embodiment of the present invention.

Please refer to FIG. 2. FIG. 2 is a schematic diagram of non-contiguous 80 MHz channel segments with a channel mask in frequency domain according to an embodiment of the present invention. Each of the non-contiguous 80 MHz channel segments is divided into four subchannels. The channel mask is used to indicate if a subchannel is active. When the channel mask is marked as "1", the subchannel is regarded as idle and active. Therefore, signals can be transmitted on the subchannel. For example, a 160 MHz transmission channel is composed of eight 20 MHz active subchannels.

Figure 3:
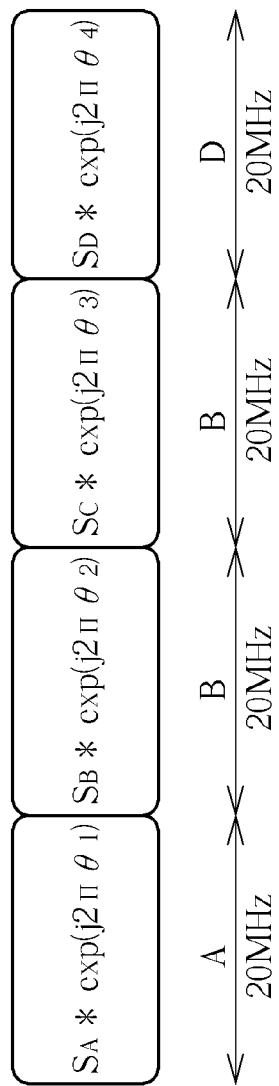
FIG. 3 is a schematic diagram of an 80 MHZ channel in frequency domain according to an embodiment of the present invention.

Please refer to FIG. 3. FIG. 3 is a schematic diagram of an 80 MHZ channel in frequency domain according to an embodiment of the present invention. The 80 MHz channel can be divided into four 20 MHz subchannels, labeled A, B, C, and D respectively from low frequency to high frequency. Signals $S_A$, $S_B$, $S_C$, $S_D$ represent signals of the subchannels A, B, C, D respectively. In order to reduce PAPRs of the signals in the 80 MHz channel, phase rotation values $\theta_1, \theta_2, \theta_3, \theta_4$ are applied into the signals $S_A, S_B, S_C, S_D$ respectively. Therefore, signals to be transmitted on the subchannels A, B, C, D can be represented by $S_A \times \exp(j2\pi\theta_1)$, $S_B \times \exp(j2\pi\theta_2)$, $S_C \times \exp(j2\pi\theta_3)$ and $S_D \times \exp(j2\pi\theta_4)$.

Figure 4:
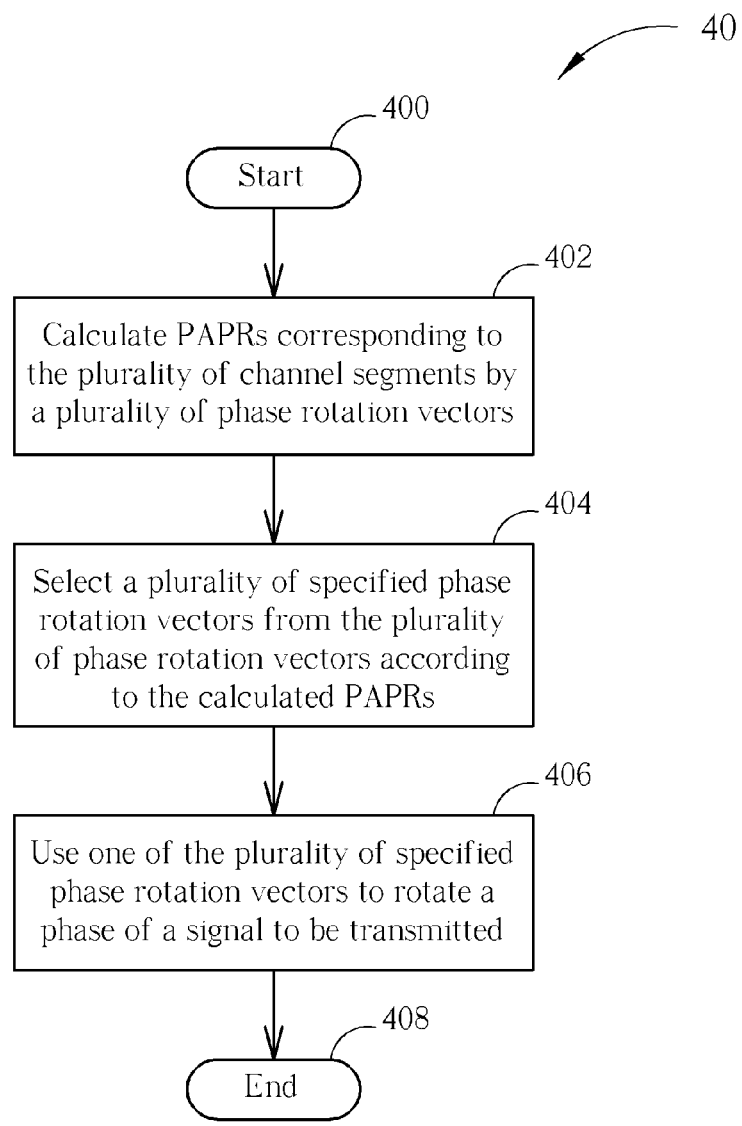
FIG. 4 is a flowchart of a process according to an embodiment of the present invention.

Please refer to FIG. 4. FIG. 4 is a flowchart of a process 40 according to an embodiment of the present invention. The process 40 is used for reducing a PAPR for a transmission channel in a wireless communication system, and the transmission channel is divided into a plurality of channel segments. A specified frequency separation is between two of the plurality of channel segments so that the transmission channel is regarded as a non-contiguous channel configuration. The process 40 comprises the following steps:

Step 400: Start.

Step 402: Calculate PAPRs corresponding to the plurality of channel segments by a plurality of phase rotation vectors.

Step 404: Select a plurality of specified phase rotation vectors from the plurality of phase rotation vectors according to the calculated PAPRs.

Step 406: Use one of the plurality of specified phase rotation vectors to rotate a phase of a signal to be transmitted.

Step 408: End.

According to the process 40, the present invention calculates PAPRs corresponding to the plurality of channel segments in the transmission channel by the plurality of phase rotation vector, to select the plurality of specified phase rotation vectors from the plurality of phase rotation vectors according to the calculated PAPRs. Afterwards, one of the plurality of specified phase rotation is used for rotating the phase of the signal to be transmitted. For simplicity, the signal to be transmitted is named sig_tx. In brief, via the present invention, the phase rotation vectors are used for calculating PAPRs corresponding to the channel segments, and the specified phase rotation vectors selected from the phase rotation vectors are used for rotating the phase of the signal sig_tx. In such a condition, when the transmission channel uses the phase rotation vectors to calculate PAPRs corresponding to the channel segments, the specified phase rotation vectors are selected from the phase rotation vectors according to the calculated PAPRs. Therefore, one of the specified phase rotation vectors is applied to rotate the phase of the signal sig_tx in the transmission channel.

Via the process 40, the PAPRs corresponding to the channel segments in the transmission channel is calculated first and then the specified phase rotation vectors are selected from the phase rotation vectors according to the calculated PAPRs, to rotate the phase of the signal sig_tx, so as to reduce PAPR of the transmission channel. Note that, the process 40 is an embodiment of the present invention and those skilled in the art can make modifications or alternations according to different requirements. For example, for reducing PAPR of the transmission channel, the step 404 is utilized for determining lower PAPRs from the calculated PAPRs, to select the specified phase rotation vectors corresponding to the lower PAPRs from the phase rotation vectors. In addition, a constant phase vector can be added into one of the plurality of specified phase rotation vectors for minimizing the PAPRs corresponding to the channel segments. Certainly, the criteria of selecting the specified phase rotation vector is not limited to what mentioned above, other criteria, such as the lowest PAPRs, can also be applied to select the specified phase rotation vector from the phase rotation vectors, so as to conform to system requirements.

Take a 160 MHz transmission channel for an example. The 160 MHz transmission channel is divided into two 80 MHz channel segments, and each of the two 80 MHz channel segments is composed of four 20 MHz subchannels A, B, C, D as shown in FIG. 3. Via the process 40, the phase rotation vectors are used for calculating PAPRs corresponding to the two 80 MHz channel segments. Afterwards, specified phase rotation vectors selected from the phase rotation vectors are used for rotating the phase of the signal sig_tx. In such a condition, the signals $S_A$, $S_B$, $S_C$, $S_D$ on the subchannels A, B, C, D are rotated with corresponding phase rotation values $\theta_1$, $\theta_2$, $\theta_3$, $\theta_4$ of the selected phase rotation vector, and signals to be transmitted on the subchannels A, B, C, D are represented by $S_A \times \exp(j2\pi\theta_1)$, $S_B \times \exp(j2\pi\theta_2)$, $S_C \times \exp(j2\pi\theta_3)$ and $S_D \times \exp(j2\pi\theta_4)$.

As can be seen from the above, four phase rotation values are assigned to four subchannels of an 80 MHz channel segment. The phase rotation vectors can be represented as an N-by-4 rotation matrix $\Phi$ related to the four phase rotation values as follows:

$$\Phi = \begin{bmatrix} \phi_{11} & \phi_{12} & \phi_{13} & \phi_{14} \\ \phi_{21} & \phi_{22} & \phi_{23} & \phi_{24} \\ \vdots & \vdots & \vdots & \vdots \\ \phi_{N1} & \phi_{N2} & \phi_{N3} & \phi_{N4} \end{bmatrix} = \begin{bmatrix} \underline{\phi}_1 \\ \underline{\phi}_2 \\ \vdots \\ \underline{\phi}_N \end{bmatrix}.$$

Furthermore, the four phase rotation values used by the subchannels A, B, C, and D are one of rows in the N-by-4 phase rotation matrix as follows:

$$[\theta_1\ \theta_2\ \theta_3\ \theta_4] = \underline{\phi}_k,\ k=1,2,\ldots,N,$$

where $\underline{\phi}_k$ is called a phase rotation vector. All phase rotation vectors in the N-by-4 phase rotation matrix $\Phi$ are applied into four subchannels of the 80 MHz channel segment, to calculate PAPRs of the 80 MHz channel segment. Afterwards, the specified phase rotation vectors are selected from the plurality of phase rotation vectors to rotate the signals $S_A$, $S_B$, $S_C$, $S_D$ according to the lowest PAPRs of the 80 MHz channel segment. The specified phase rotation vectors can be combined into an 8-by-4 phase rotation matrix $\Phi_{80}$ as follows:

$$\Phi_{80} = \begin{bmatrix} 0 & 0.5 & 0 & 0 \\ 0 & 0 & 0.5 & 0 \\ 0 & 0.75 & 0 & 0.25 \\ 0 & 0.25 & 0.5 & 0.25 \\ 0 & 0 & 0 & 0.5 \\ 0 & 0.5 & 0.5 & 0.5 \\ 0 & 0.25 & 0 & 0.75 \\ 0 & 0.75 & 0.5 & 0.75 \end{bmatrix}.$$

In other words, when each of phase rotation vectors in the 8-by-4 phase rotation matrix $\Phi_{80}$ is selected for the subchannels of the 80 MHz channel segment, the lowest PAPR can be obtained to reach the goal for reducing PAPRs by the phase rotation method after calculating the PAPR of the 80 MHz channel segment.

Note that, the phase rotation values in the 8-by-4 phase rotation matrix $\Phi_{80}$ are represented by a radian format. In addition, for specifically illustrating a real rotating angle, the 8-by-4 phase rotation matrix $\Phi_{80}$ can be transformed into an 8-by-4 phase rotation matrix $\Phi'_{80}$ with an angle format by multiplying the 8-by-4 phase rotation matrix $\Phi_{80}$ with $2\pi$ as follows:

$$\Phi'_{80} = 2\pi \times \Phi_{80} = \begin{bmatrix} 0° & 180° & 0° & 0° \\ 0° & 0° & 180° & 0° \\ 0° & 270° & 0° & 90° \\ 0° & 90° & 180° & 90° \\ 0° & 0° & 0° & 180° \\ 0° & 180° & 180° & 180° \\ 0° & 90° & 0° & 270° \\ 0° & 270° & 180° & 270° \end{bmatrix}.$$

Furthermore, the signals to be transmitted on the subchannels A, B, C, D are represented by an exponential format as $S_A \times \exp(j2\pi\theta_1)$, $S_B \times \exp(j2\pi\theta_2)$, $S_C \times \exp(j2\pi\theta_3)$ and $S_D \times \exp(j2\pi\theta_4)$. For reducing complexity of calculations, the exponential part of the signals to be transmitted can be calculated first with the 8-by-4 phase rotation matrix $\Phi_{80}$ as follows:

$$\Phi''_{80} = \exp(j2\pi\Phi_{80}) = \begin{bmatrix} 1 & -1 & 1 & 1 \\ 1 & 1 & -1 & 1 \\ 1 & -j & 1 & j \\ 1 & j & -1 & j \\ 1 & 1 & 1 & -1 \\ 1 & -1 & -1 & -1 \\ 1 & j & 1 & -j \\ 1 & -j & -1 & -j \end{bmatrix}.$$

Therefore, the signals to be transmitted on the subchannels A, B, C, D can be calculated simply by multiplying signals $S_A$, $S_B$, $S_C$, $S_D$ with the selected phase rotation vector of the 8-by-4 phase rotation matrix $\Phi''_{80}$. For example, when the selected phase rotation vector is the sixth phase rotation vector $[1\ -1\ -1\ -1]$ of the 8-by-4 phase rotation matrix $\Phi''_{80}$, the signals $S_A$, $S_B$, $S_C$ and $S_D$ are multiplied with $1$, $-1$, $-1$, $-1$ respectively, and the signals to be transmitted on the subchannels A, B, C, D are $S_A$, $-S_B$, $-S_C$, $-S_D$.

In addition, a constant phase vector can be added into the selected phase rotation vector for the 80 MHz channel segment, to improve the PAPR reduction of the 160 MHz transmission channel. For example, four phase rotation values used for the 80 MHz channel segments can be one of the phase rotation vector of the N-by-4 phase rotation matrix $\Phi$ plus the constant phase vector as shown below:

$$[\theta_1\ \theta_2\ \theta_3\ \theta_4] = \underline{\phi}_k + [\alpha\ \alpha\ \alpha\ \alpha],\ k=1,2,\ldots,N.$$

Therefore, the four phase rotation values can be simply represented as [row_index, constant_phase]. The row_index is an index of the selected phase rotation vector in the N-by-4 phase rotation matrix $\Phi$, and the constant_phase is the value of the constant phase vector. If the PAPR of the 80 MHz channel segment can be minimized by the selected phase rotation vector, the selected phase rotation vector is one of the phase rotation vectors of the 8-by-4 phase rotation matrix $\Phi_{80}$.

As can be seen from FIG. 1, the total PAPR of the transmitter system is related to the PAPRs and the frequency separation in the upper part and the lower part. Therefore, in order to select a phase rotation vector to minimize the PAPR of the 160 MHz transmission channel, different combinations of the phase rotation vectors and the constant phase vectors can be used for calculating the PAPR of the 160 MHz transmission channel. Note that, the phase rotation vectors can be selected from the 8-by-4 phase rotation matrix $\Phi_{80}$, and the constant phase vector can be any constant value. For example, the constant phase vector is a zero vector [0 0 0 0], and the selected phase rotation vector is the sixth phase rotation vector [0 0.5 0.5 0.5] of the 8-by-4 phase rotation matrix $\Phi_{80}$. Therefore, a new phase rotation vector is the sixth phase rotation vector [0 0.5 0.5 0.5] plus the constant phase vector [0 0 0 0]. In other words, the new phase rotation vector is [0 0.5 0.5 0.5], the same as the sixth phase rotation vector of the 8-by-4 phase rotation matrix $\Phi_{80}$. From the above, the new phase rotation vector [0 0.5 0.5 0.5] can be mapped as the sixth phase rotation vector [0° 180° 180° 180°] of the 8-by-4 phase rotation matrix $\Phi_{80}'$ and the sixth phase rotation vector [1 −1 −1 −1] of the 8-by-4 phase rotation matrix $\Phi_{80}''$. Finally, the 160 MHz transmission channel (i.e. two non-contiguous 80 MHz channel segments) is utilized [1 −1 −1 −1] [1 −1 −1 −1] to rotate phases of signals to be transmitted in the two 80 MHz non-contiguous channel segments, so as to minimize the PAPR of the 160 MHz transmission channel.

Please refer to FIG. 5. FIG. 5 is a table 50 according to an embodiment of the present invention. The table 50 shows simulation results based on a varying frequency separation between the two 80 MHz channel segments. Moreover, the phase rotation vectors used in the two 80 MHz channel segments are selected according to the lowest PAPR of the 160 MHz transmission channel. For example, when the frequency separation is 160 MHz, [row_index, constant_phase]=[7,0] is used for the lower 80 MHz channel segment in frequency domain. Therefore, the selected phase rotation vector for the lower 80 MHz channel segment is the seventh phase rotation vector [0 0.25 0 0.75] of the 8-by-4 phase rotation matrix $\Phi_{80}$ plus the constant phase vector [0 0 0 0]. Similarly, [row_index, constant_phase]=[1,0.25] is used for the higher 80 MHz channel segment in frequency domain. Therefore, the phase rotation vector of the higher 80 MHz channel segment is the first phase rotation vector [0 0.5 0 0] of the 8-by-4 phase rotation matrix $\Phi_{80}$ plus the constant vector [0.25 0.25 0.25 0.25]. In other words, for rotating phases of signals in the 160 MHz transmission channel, a new phase rotation vector [0 0.25 0 0.75] is used for the lower 80 MHz channel and a new phase rotation vector [0.25 0.75 0.25 0.25] is used for the higher 80 MHz channel. However, simulations made for all possible frequency separation values may take much time for exhaustively searching. The present invention provides a simple solution for solving the problem of time, which is to select the [row_index, constant_phase] equal to [2,0.75] for all frequency separation in the 160 MHz transmission channel. In brief, a new phase rotation vector for the two 80 MHz channel segments, equal to the second phase rotation vector [0 0 0.5 0] of the 8-by-4 phase rotation matrix $\Phi_{80}$ plus the constant phase vector [0.25 0.25 0.25 0.25], is [0.25 0.25 0.75 0.25].

Note that, the main concept of the present invention is to apply phase rotation for the non-contiguous channel configuration to reduce PAPRs, and those skilled in the art can make alternations or modifications accordingly. For example, the [row_index, constant_phase]=[2,0.75] is the better simulation result for all frequency separation of the 160 MHz transmission channel with the two 80 MHz channel segments. However, in practice, material, efficiency, etc. of electronic components in circuit of the transmitter system may affect the simulation result as well. Therefore, an appropriate phase rotation vector and a corresponding constant phase vector are chosen accordingly, to reduce PAPRs of the 160 MHz transmission channel.

Moreover, the selected phase rotation vectors according to the lower PAPRs can reduce PAPRs of the transmission channel with the non-contiguous channel configuration, and the constant vector may be used for further decreasing PAPRs of the transmission channel. Thus, a zero constant vector may be applied into the selected phase rotation vector to reduce simulation efforts, circuit complexity of the transmitter or compensate other interference.

In conclusion, the present invention provides the method of phase rotation for the non-contiguous channel configuration, to reduce the PAPR of the transmission channel. Therefore, the present invention can be applied into IEEE 802.11ac standard to reduce PAPR of the transmission channel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of reducing a signal peak to average power ratio (PAPR) for a transmission channel in a wireless communication system, wherein the transmission channel is divided into a plurality of non-contiguous channel segments, the method comprising:
    calculating PAPRs corresponding to the plurality of non-contiguous channel segments by a plurality of phase rotation vectors;
    selecting a plurality of specified phase rotation vectors from the plurality of phase rotation vectors according to the calculated PAPRs; and
    using one of the plurality of specified phase rotation vectors to rotate a phase of a signal to be transmitted.

2. The method of claim 1, wherein the step of selecting the plurality of specified phase rotation vectors from the plurality of phase rotation vectors according to the calculated PAPRs comprises:
    determining a plurality of lower PAPRs from the calculated PAPRs; and
    selecting the plurality of specified phase rotation vectors corresponding to the plurality of lower PAPRs from the plurality of phase rotation vectors.

3. The method of claim 1 further comprising adding a constant phase vector to the plurality of specified phase rotation vectors for minimizing the PAPRs corresponding to the plurality of non-contiguous channel segments.

4. The method of claim 3, wherein the constant phase vector is a zero vector.

5. The method of claim 1, wherein each of the plurality of non-contiguous channel segments comprises four subchannels and the plurality of specified phase rotation vectors are [0° 180° 0° 0°], [0° 0° 180° 0°], [0° 270° 0° 90°], [0° 90° 180° 90°], [0° 0° 0° 180°] [0° 180° 180° 180°] [0° 90° 0° 270°] [0° 270° 180° 270°].

6. A transmitter of a wireless communication system capable of performing the method of claim 1.

7. A transmission method for a wireless communication system, the method comprising:
    dividing a transmission channel into a plurality of non-contiguous channel segments for transmitting a signal; and
    applying a phase rotation vector to the signal to be transmitted on a plurality of subchannels in each of the plurality of non-contiguous channel segments.

8. The transmission method of claim 7, wherein each of the plurality of channel segments comprises four subchannels and the phase rotation vector is [1 −1 1 1], [1 1 −1 1], [1 −j 1 j], [1 j −1 j], [1 1 1 −1], [1 −1 −1 −1], [1 j 1 −j], or [1 −j −1 −j].

9. The method of claim 7, further comprising, calculating PAPRs corresponding to the plurality of non-contiguous channel segments by a plurality of phase rotation vectors;

determining a plurality of lower PAPRs from calculated PAPRs; and selecting a phase rotation vector corresponding to the plurality of lower PAPRs from the plurality of phase rotation vectors.

10. The method of claim 9 further comprising adding a constant phase vector to the plurality of specified phase rotation vectors for minimizing the PAPRs corresponding to the plurality of channel segments.

11. The method of claim 10, wherein the constant phase vector is a zero vector.

* * * * *